US007612688B1

(12) United States Patent
Vigeant-Langlois et al.

(10) Patent No.: US 7,612,688 B1
(45) Date of Patent: Nov. 3, 2009

(54) INFLIGHT WEATHER SERVICE

(75) Inventors: Laurence Vigeant-Langlois, North Andover, MA (US); Damon Hill, Williamsburg, VA (US); James W. Flynn, Medford, MA (US); Paul M. Creamer, North Andover, MA (US)

(73) Assignee: WSI Corporation, Andover, MA (US)

( * ) Notice: Subject to any disclaimer, the term of this patent is extended or adjusted under 35 U.S.C. 154(b) by 0 days.

(21) Appl. No.: 11/372,820

(22) Filed: Mar. 10, 2006

Related U.S. Application Data

(60) Provisional application No. 60/660,170, filed on Mar. 10, 2005.

(51) Int. Cl.
*G01C 21/00* (2006.01)

(52) U.S. Cl. .................. 340/971; 340/945; 340/973; 340/539.28

(58) Field of Classification Search ............ 340/539.28, 340/971, 973, 945
See application file for complete search history.

(56) References Cited

U.S. PATENT DOCUMENTS

| | | | | |
|---|---|---|---|---|
| 4,347,618 A * | 8/1982 | Kavouras et al. | ............ | 375/259 |
| 4,521,857 A * | 6/1985 | Reynolds, III | ............ | 340/5.91 |
| 5,265,024 A * | 11/1993 | Crabill et al. | ............... | 701/200 |
| 5,519,392 A * | 5/1996 | Oder et al. | .................. | 340/990 |
| 5,671,342 A * | 9/1997 | Millier et al. | ............... | 345/418 |
| 6,014,606 A * | 1/2000 | Tu | ............................. | 701/200 |
| 6,160,497 A * | 12/2000 | Clark | .......................... | 340/961 |
| 6,184,816 B1 * | 2/2001 | Zheng et al. | ................. | 340/945 |
| 6,199,008 B1 * | 3/2001 | Aratow et al. | ............... | 701/120 |
| 6,381,538 B1 * | 4/2002 | Robinson et al. | ............ | 701/211 |
| 6,501,392 B2 * | 12/2002 | Gremmert et al. | ........... | 340/971 |
| 6,552,669 B2 * | 4/2003 | Simon et al. | ................. | 340/945 |
| 6,590,529 B2 * | 7/2003 | Schwoegler | ........... | 342/357.13 |
| 6,633,801 B1 * | 10/2003 | Durlacher et al. | ........... | 340/973 |
| 6,828,922 B1 * | 12/2004 | Gremmert et al. | ........... | 340/949 |
| 6,842,122 B1 * | 1/2005 | Langner et al. | ............. | 340/945 |
| 6,917,860 B1 * | 7/2005 | Robinson et al. | ....... | 340/539.28 |
| 6,970,104 B2 * | 11/2005 | Knecht et al. | ................ | 340/980 |
| 6,995,686 B2 * | 2/2006 | Gosdin et al. | ............... | 340/905 |
| 7,027,898 B1 * | 4/2006 | Leger et al. | .................... | 701/14 |
| 7,039,505 B1 * | 5/2006 | Southard et al. | ............ | 340/971 |
| 7,081,834 B2 * | 7/2006 | Ruokangas et al. | ......... | 340/945 |
| 2005/0007261 A1 * | 1/2005 | Berson et al. | ................ | 340/945 |
| 2006/0129286 A1 * | 6/2006 | King | .............................. | 701/4 |

* cited by examiner

*Primary Examiner*—Eric M Blount
(74) *Attorney, Agent, or Firm*—Lawrence A. Aaronson, P.C.

(57) ABSTRACT

A weather briefing system that may be used in the cockpit to provide near real-time graphic and text weather information. Weather information and pilot reports are fed to the cockpit from, e.g., a satellite in geosynchronous orbit. Once delivered to the aircraft, the system processes the data stream and formats it for delivery to an end user device. The data is collected from an extensive network of sources. The end user device may be a portable electronic flight bag (EFB), panel-mounted display (MFD), or similar device programmed to display the formatted data. The system provides timely and accurate weather information to pilots of all types of aircraft. This information may be used for pre-flight planning and in-flight decision-making.

20 Claims, 14 Drawing Sheets

INFLIGHT WEATHER SERVICE

CROSS-REFERENCE TO RELATED APPLICATIONS

The present invention claims the benefit of priority of U.S. Provisional Application No. 60/660,170, filed Mar. 10, 2005, entitled "INFLIGHT WEATHER SERVICE," which is incorporated herein by reference in its entirety.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2006 WSI Corporation, All Rights Reserved.

FIELD OF THE INVENTION

The present invention is directed to weather information systems. In particular, the present invention is directed to a comprehensive cockpit weather briefing system that provides near real-time graphic and text weather information.

BACKGROUND OF THE INVENTION

Weather is the environment in which pilots and air carriers choose to operate. Adverse weather impact the safety and efficiency of air transportation. Weather is a contributing factor in nearly 25% of accidents and in over 30% of fatal accidents in the US every year. One problem is that the weather data that is provided to pilots, both on the ground and in the air, is text-based. Obscure codes make it difficult to quickly understand the weather conditions as pilots need to decipher and translate TAFs and METARs into plain language.

Further, weather conditions affect routes and fuel consumption, which ultimate affects an airline's operating efficiency and passenger satisfaction. Often, extra fuel is loaded because of unknown weather conditions as a safety measure which adds weight and increases consumption. In-flight hazards, such as turbulence may not be known to a pilot until the airplane is in flight. This makes it harder to avoid such hazards and select new routes. More importantly, convective weather such as airmass and line storms cause ground delays, disruptions and inefficient aircraft deviations and diversions. Weather is a source of major source of delays in the National Airspace System and analytical studies on this topic have quantified avoidable delays to over $300 millions (Evans, 2004).

Thus, there is a need to provide better, more decipherable information to pilots. Pilots need to be better informed and more prepared in order to increase safety. Better information will also reduces operating costs and delays, and ultimately increases customer satisfaction.

SUMMARY OF THE INVENTION

The present invention is directed to a system of providing weather data to pilots to provide graphical and textual information that is near real-time, accurate and more easily understood. A stream of weather information is fed to the cockpit from, e.g., a satellite in geosynchronous orbit. The satellite position preferably provides signal coverage at any altitude throughout the continental United States. Once delivered to the aircraft, the system processes the raw data stream and formats it for delivery to an end user device. The data is collected from an extensive network of sources around the world including, but not limited to: the National Oceanic and Atmospheric Administration (NOAA), the National Weather Service (NWS), the National Center for Environmental Prediction (NCEP), the Federal Aviation Administration (FAA), the Department of Defense (DOD), and Environment Canada. The end user device may be a portable electronic flight bag (EFB), panel-mounted display (MFD), or similar device that can display the formatted data to the cockpit crew or other user.

The present invention provides timely and accurate weather information to pilots of all types of aircraft. This information may be used for pre-flight planning and in-flight decision-making. The present invention may serve to improve aviation safety and utility, reduce the number of injuries attributable to unexpected turbulence, reduce travel delays, and provide fuel savings and other operational benefits particularly in instrument and night conditions. Similar improvements are expected in VFR operations.

Additional features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
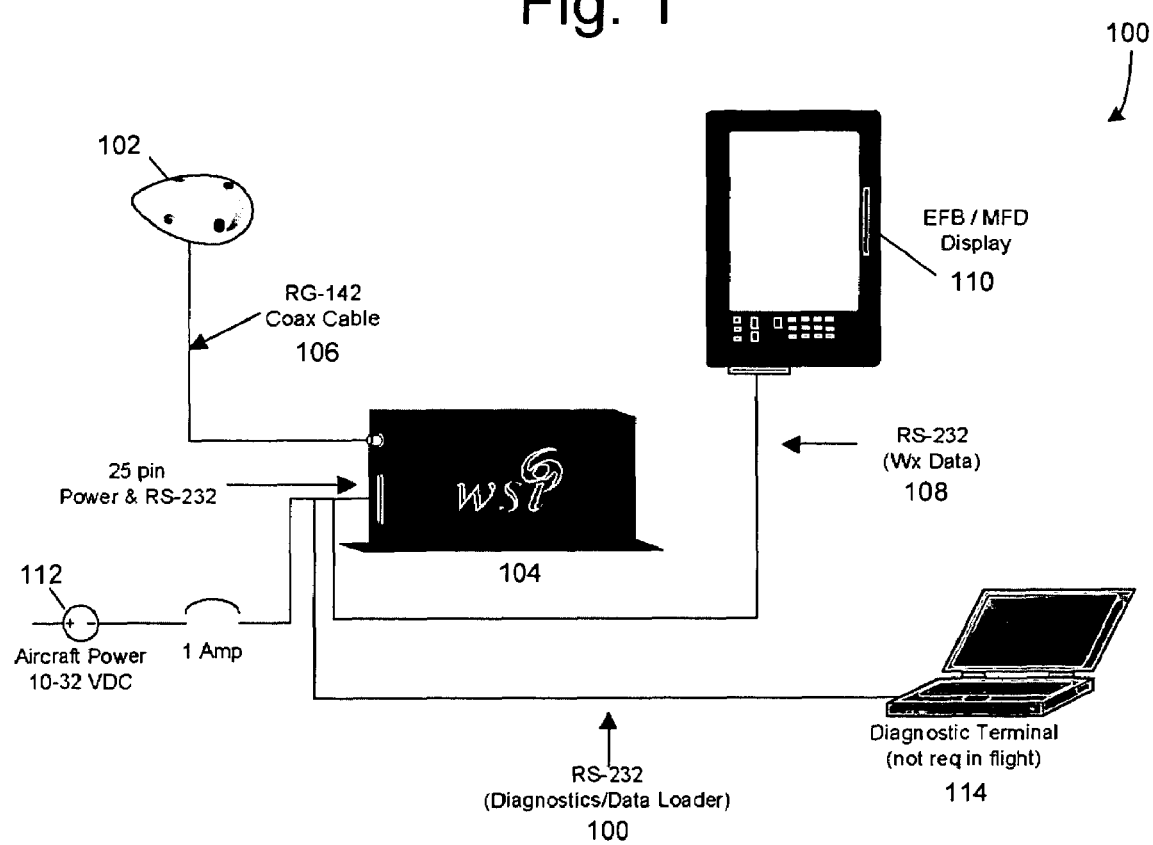
FIG. 1 is a block diagram illustrating exemplary components that comprise the weather briefing system.

The present invention is directed to a weather briefing system that may be used in the cockpit to provide near real-time graphic and text weather information and other relevant information for aviation. A stream of weather information is fed to the cockpit from, e.g., one or multiple satellites in geosynchronous orbit, satellites in elliptical orbit, ground-based communication systems, ground-based or satellite-based broadband access to aircraft, gatelink-type wireless or wired internet connections, cell phone links, portable devices that connect to the internet or a phone system and can port data into hardware on the aircraft, etc. The combination of ground-based and/or satellite communication systems preferably provide signal coverage to the aircraft at any altitude throughout the relevant geographical areas, such as the continental United States, North America or the world. Once delivered to the aircraft, the system processes the raw data stream and formats it for delivery to an end user device via, e.g., a serial RS-232 data port, a USB port, Bluetooth, Ethernet, etc. The data could also be provided via multiple communication mechanisms to either a separate receiver component, a display or both. The data is collected from an extensive network of sources around the world including, but not limited to: the National Oceanic and Atmospheric Administration (NOAA), the National Weather Service (NWS), the National Center for Environmental Prediction (NCEP), the Federal Aviation Administration (FAA), the Department of Defense (DOD), and Environment Canada, industry, other aircraft. The data can also relate to flight plan data, routes cleared with air traffic control under IFR, airspace (e.g., Temporary Flight Restrictions, near-real-time activity or hours of operations of Special Use Airspace and Military Operation Airspace, active Ground Delay Programs at selected airports; swap routes available under Collaboration Decision-Making), charts (e.g., airport-related Notice to Airmen). The end user device may be a portable electronic flight bag (EFB), panel-mounted display (MFD), or similar device that can display the formatted data to the cockpit crew or other user. In addition, the data may be used by other systems on-board the aircraft that support communication, navigation and surveillance (e.g., Flight Management Systems, satellite phone that downlink data upon noticing discrepancies between forecast and observed data, and surveillance systems that notice discrepancies between transponder-reported pressure altitude and forecasted or nowcasted pressure altitude).

The present invention advantageously provides timely and accurate weather information to pilots of all types of aircraft. This information is used by pilots for pre-flight planning and in-flight decision-making. The present invention may serve to improve aviation safety and utility, reduce the number of injuries attributable to unexpected turbulence, reduce travel delays, and provide fuel savings and other operational benefits particularly in instrument and night conditions. Similar improvements are expected in VFR operations.

The system can be used to process and possibly interpolate or extrapolate data in order to provide new weather information that was not uplinked to it. For example, a numerical forecast model of winds or a convective forecast model based on advection could be run inside either the receiver and/or the client/software application to provide new weather data that is typically obtained by running such numerical models by computers on the ground.

The data received by the system can be obtained via a multiplicity of communication links and optimized for bandwidth utilization on the basis of the relevant parameters (e.g., update rate, spatial resolution, spatial coverage, etc.) of the various data streams and the temporal utility of the data along one or multiple specified aircraft trajectories. For example, the system could received low-update-frequency data such as Notice to Airmen (NOTAMs) and Temporary Flight Restrictions (TFRs) information using a wireless internet connection such as WiMax on the ground, receive a frequent broadcast of METAR and radar data via a broadcast satellite link, as well as, through a request-reply The data can also be used via on-board systems such as Flight Management Systems, Multi-Function Displays, EFBs to update on-board calculations of performance data (e.g., take-off and landing distances based on updated surface winds, pressure altitude, braking action, etc.), navigation data (e.g., desired cruising altitude based on updated wind data and/or turbulence PIREPs)

Referring to FIG. 1, the system 100 includes an omni-directional antenna 102 mounted on top of an aircraft with a clear view of the sky in all directions. The antenna 102 is connected to a receiver 104 via, e.g., a coaxial cable 106. A data wiring harness 108 connects the receiver 104 and a multi-function display (MFD) 110. Alternatively, a handheld computer (e.g., Pocket PC, Palm device, etc.) may function as the display 110. Airplane DC power 112 provides power to the receiver 104, which in turn, powers the antenna 102 through the coaxial cable 106. A diagnostic terminal 114 may used to troubleshoot/configure the system 100, however the terminal 114 is not required in-flight for operation.

An exemplary set of components comprising the system 100 may be as follows. The receiver 104 may comprise a WSI InFlight AV-100 or AV-200 System. The antenna 102 may comprise a Comant L-Band antenna. The receiver 104 may be installed in a temporary and removable manner (carry-on/carry-off) inside the pressure vessel of an aircraft. If the receiver is installed in a permanent manner, it is preferably in a dry location inside or outside of the pressure vessel of the aircraft. Consideration of the environmental specifications is necessary when choosing a mounting location. Suitable alternatives known by those of ordinary skill in the art may be used. The receiver may be a dedicated hardware component installed inside or outside the pressure vessel of pressurized aircraft, or may also be embedded into other hardware components installed in an aircraft, such as an antennas, displays (EFB, MFD), navigation systems (FMS), other sensors (e.g., airborne radar, lightning detection systems) communication systems (satellite phone, broadband receiver), Cabin Entertainment System, Transponders, data recording systems (e.g., cockpit voice recorders, digital data recorders, quick access recorders, etc.), etc.

The antenna 102 is preferably mounted to account for structural skin integrity, interfering radio transmission and ease of serviceability. A doubler plate or other equivalent skin reinforcement method may be used for structural integrity and to ease antenna replacement, if required. For the case where data is delivered from a satellite in geosynchronous orbit, the antenna 102 is preferably mounted high on the top of the airframe skin. The coaxial cable 106 (or equivalent) connects the antenna 102 and receiver 104. The length needed is limited only by signal loss, which is preferably less than 10 dB. Although not shown, a GPS location input (not shown) may be used with the system 100. A third party GPS RS-232 output may be used to feed the chosen EFB/MFD 110. The antenna may also be a combination antenna that serves multiple purposes and is tuned to multiple frequencies, such as a combo GPS/WSI or VHF/WSI antenna.

The system 100 includes a comprehensive cockpit weather briefing system. It provides up-to-the-minute graphic and text weather information for pre-flight planning and in-flight use. A continuous stream of mission-critical weather information displays on your portable or panel-mounted display. Updates can be received at regular or irregular intervals of times, either based on updated data frequency or data freshness value for the user (e.g., every five minutes at altitude using a broadcast system, etc.). High resolution displays provide a high "glance value" for in-flight use. The resolution of the data sent to an aircraft and of the data presented on the display may be varied according to the desired application.

The system 100 includes software that operates on the display device 110. The software may consist of two components: a client application which displays the weather data, and a configuration utility which enables users to choose settings for the system. The configuration utility may allow adjustment of display settings (e.g., to customize the appearance of the display or height and width of the window display size, etc.). The software application may also be embedded or provided in conjunction with other software application that use weather data to present it in superposition with relevant geographical data (e.g., navigation charts, topographical information, air traffic management information such as real-time airport capacity or acceptance rate, available air traffic management swap routes under Collaboration Decision-Making, etc.), or data that may be used in other applications (e.g., weight and balance calculations, flight management system computations, etc.)

Figure 2:
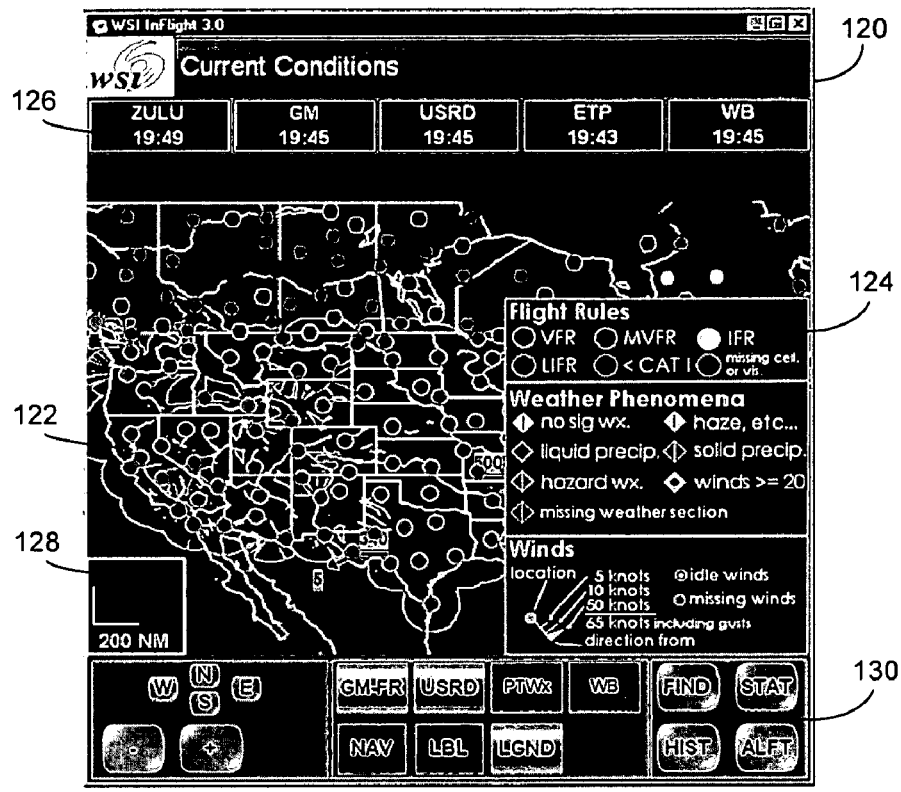
FIG. 2 is an exemplary representation of the present weather conditions.

Referring now to FIG. 2, there is illustrated an exemplary current conditions window 120. The window 120 includes a base map 122 on which U.S. and Canadian weather radar, echo tops, graphical METARs, SIGMETs, AIRMETs, TFRs, navigation aids (VORs, NDBs), etc. are shown. Other features, such as a legend 124, graphical TAFs (included in the Trend display), historical loops, winds/temperatures aloft, and textual METARs, TAFs, SIGMETs, AIRMETs, and TFRs. After the system 100 initializes, the window 120 is shown and communication with the receiver 104 is established. At initial startup, the window 120 preferably displays, e.g., graphical METARs, NOWrad radar, and the legend 124. Subsequent startups may display weather products, legend, and map position and zoom level selections in effect at the previous shutdown.

The current conditions window 120 includes a data freshness bar 126 and a reference scale 128, as well as a panel of buttons 130 that may be selected to overlay weather products, display/hide the legends, pan/zoom the map, and access other features such as animation loops and airport ID lookup. The data freshness bar 126 at the top of the current conditions window 120 uses color codes to show the currency of the last-received weather products. ZULU is the current time according to a local computer clock. The product times indicate when each weather product was assembled and time-stamped on the ground. Each product's time-stamp is compared to the computer's clock to determine the data's "age," and indicates the age graphically, either using color codes, texture, shape, etc. The representation (e.g., color) can be updated as current products age or are replaced with new transmissions.

The scale box 128 in the lower left corner of the map shows the horizontal and vertical scale for the current zoom level in nautical miles. The buttons 130 at the bottom of the current conditions window 120 are provided to, e.g., move/zoom the map in the display window; overlay selected weather products; turn on/off the display of navigation aids, labels and the legend; and open other windows for additional functions. Clicking product buttons in the center panel multiple times may cycle through a series of overlays, for example, the GM-FR button provides access to different types of graphical METARs. Other buttons may toggle off/on and grey buttons may be used to indicate the product or feature is turned off.

Figure 3:
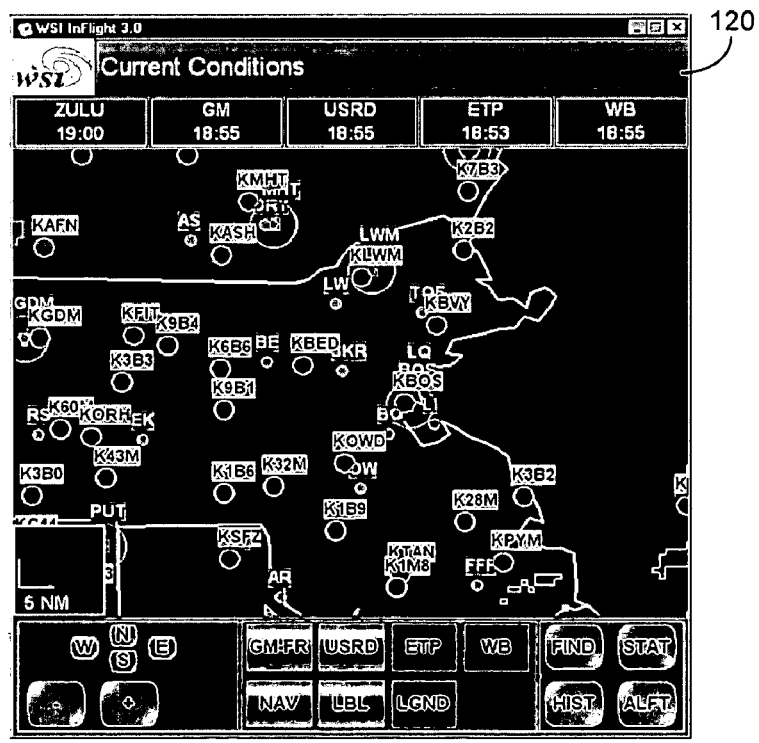
FIG. 3 illustrates the use of a LBL button may to turn on/off the display of airport identifier and navigation aid labels.
Figure 4:
FIGS. 4-8 illustrate exemplary legends that provide explanations of the graphical information.
Figure 5:
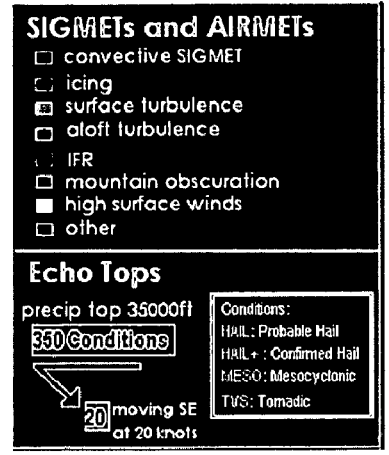
Figure 6:
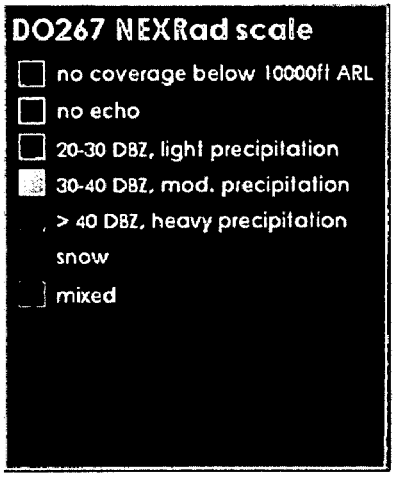
Figure 7:
Figure 8:
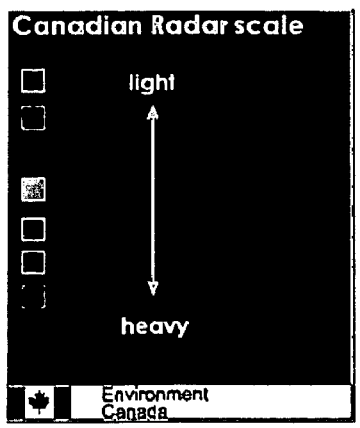

As shown in FIG. 3, a LBL button may be used to turn on/off the display of airport identifier and navigation aid labels. FIGS. 4-8 illustrate exemplary legends that provide explanations of the graphical METARs and TAFs, radar, watch boxes (AIRMETs and SIGMETs), and Echo Tops icons. To turn the legend on for reference, the LGND button is selected. To cycle through the three-page display and close the legend, the LGND button or the legend panel is selected.

The first legend page (FIG. 4) shows the graphical METAR, TAF, and wind icons. The second legend page (FIG. 5) shows the watch box AIRMET and SIGMET color codes and an explanation of the Echo Top display. The third legend page (FIGS. 6-8) shows the precipitation radar colors. The radar legend automatically corresponds to the radar type and color palette selected. The radar type may be either US or Canadian, and is selected via the button panel. The color palette may be selected using the configuration program.

The current conditions window 120 displays circle graphical METAR icons when the system 100 loads. Three graphical icons are used to summarize weather information for each reporting airport in the continental US and Canada:

| | |
|---|---|
| Circles: | Flight rules |
| Diamonds: | Weather conditions |
| Barbs: | Surface wind speed and true direction |

The GM button may be used to toggle between these three icons to provide a user with a better understanding of weather conditions. Table 1 below lists the flight rules and associated color codes.

TABLE 1

| Color | Category | Ceiling (in feet) | Visibility (in nautical miles) |
|---|---|---|---|
| Black | Not Enough Data | | |
| Cyan (sky blue) | VFR | >3000 | >5 |
| Green | MVFR | 1000-3000 | 3-5 |
| Yellow | IFR | 500-1000 | 1-3 |
| Red | LIFR | 200-500 | ½-1 |
| Magenta | < Cat 1 type approaches | <200 | 0-½ |

Colored diamond icons (see, e.g., FIG. 9, described below) represent the weather conditions at each reporting airport. The left side of the diamond shows the worst observed weather and the right side alerts pilots as to whether potentially dangerous visibility conditions currently exist. If the right half of the diamond is the same color as the left, there are no obstructions to pilot visibility. If the right half of the diamond is yellow, visibility obstructions exist at the airport represented by the diamond. If windy conditions (i.e., sustained winds or gusts)>=20 knots exist at an airport, a small black diamond is drawn in the center of the icon. Both sides of each diamond icon are drawn in black if there is not enough data. Table 2 explains the weather conditions and their associated color codes.

TABLE 2

| Color | Weather Phenomena Class | Phenomena |
|---|---|---|
| Black (both sides) | Not enough data or data has aged out | |
| White | No significant weather | |
| Green | Liquid precipitation | Drizzle (DZ) Rain (RA) Showers in vicinity (VCSH) Unknown precipitation (UP) |

TABLE 2-continued

| Color | Weather Phenomena Class | Phenomena |
|---|---|---|
| Blue | Solid precipitation | Snow (SN) Snow grains (SG) Ice crystals (IC) Ice pellets (PE) Hail (GR) Small hail (GS) Volcanic ash (VA) Sand (SA) Sand/dust whirls (PO) Sand storm (SS) Dust storm (DS) |
| Red | Hazardous phenomena (thunderstorms, etc.) | Thunderstorm (TS) Funnel cloud, tornado, waterspout (FC) Squall (SQ) |
| Yellow | Obstruction to visibility | Fog (FG) Haze (HZ) Smoke (FU) Spray (PY) Mist (BR) Sand (SA) Dust (DU) Volcanic ash (VA) |
| Black diamond in center of icon | Winds >= 20 knots | Taken from either steady state or gust value |

Wind barb icons represent surface observations of wind speed and direction at each reporting airport. The direction is preferably true, not magnetic. Wind is blowing from the direction in which the barb points. Speed is indicated by the total of the feathers on the barb. There are three types of feathers: a short feather indicates 5 knots, a long feather 10 knots, and a filled triangular pennant 50 knots. A barb with one short and two long feathers, for example, indicates 25 knots. A circle with no barb indicates calm winds. A hollow circle means no data.

Figure 9:
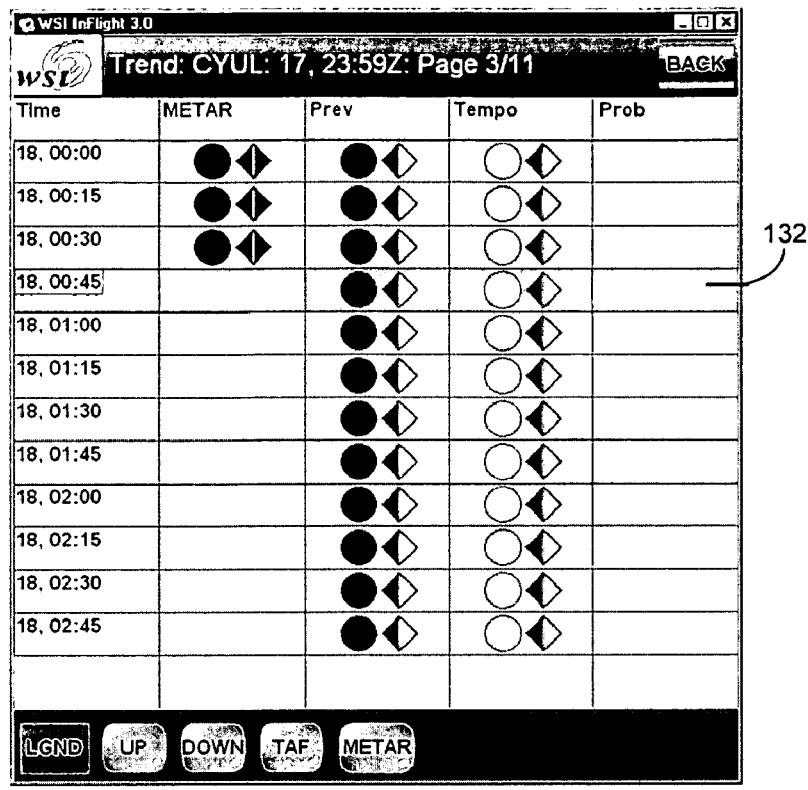
FIG. 9 illustrates exemplary trend data and a split diamond icon.

FIG. 9 shows a trend window 132, which provides a graphic overview of actual conditions contrasted with the forecasted conditions as provided by METARs and TAFs, respectively. The display uses the same icons used by the graphical METARs (e.g., circles for flight rules and diamonds for weather conditions) and shows both the category and phenomenon icons in 15 minute intervals.

The current time is indicated with a grey bar for quick reference and in most cases will be close to the most recent METAR shown. The window 132 allows the user to quickly evaluate how forecasts (e.g., Prev, Tempo and Prob, described below) have compared with actual conditions (METAR). Forecast conditions can be checked for the estimated time of arrival.

The forecasts preferably fall into three categories:

Prev—Prevailing conditions.

Tempo—Temporary conditions expected to last generally less than four hours at a time, and expected to occur less than half of the time period for which the Tempo conditions are indicated Prob—Indicates a 30%-40% probability/chance of conditions occurring, along with the associated Prev (prevailing) conditions.

Figure 10:
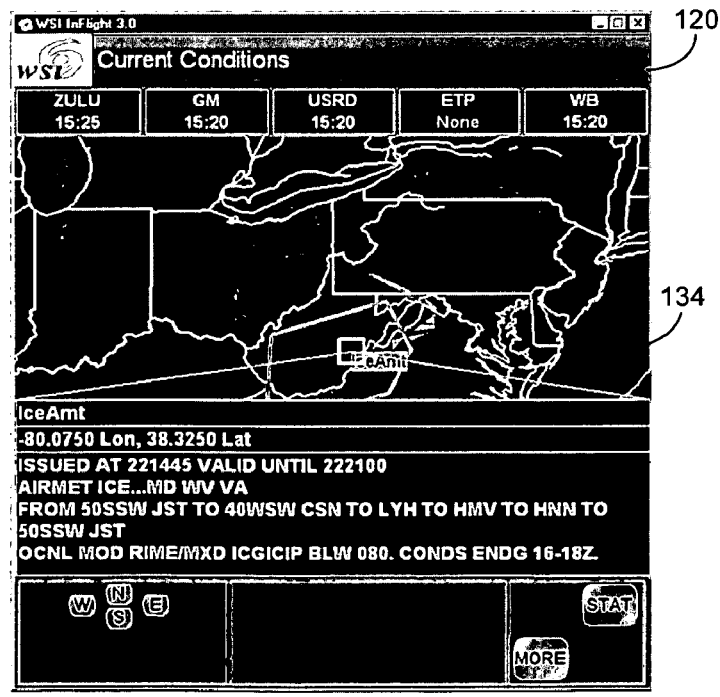
FIG. 10 illustrates exemplary SIGMET and AIRMET display regions.

Referring to FIG. 10, SIGMET and AIRMET (i.e., watch boxes) display regions, outlined by bounding boxes 134, where pilots may encounter weather warning conditions such as convective storms, turbulence, icing, or obstructions to visibility. Regions under TFRs (temporary flight restrictions) may also be displayed. SIGMET, AIRMET, and TFR information may be displayed by clicking the watch box button. The SIGMETs and AIRMETs are color coded for immediate visual recognition. Table 3 lists the color code used with each weather warning type.

TABLE 3

| Color Code | Button Label | Condition Type |
|---|---|---|
| Magenta | SMET | Convective SIGMET |
| Blue | Z-AMET | Icing AIRMET |
| Yellow Green | T-AMET | Surface/aloft turbulence AIRMET |
| Red Magenta | S-AMET | IFR conditions/mountain obscuration AIRMET |

Figure 11:
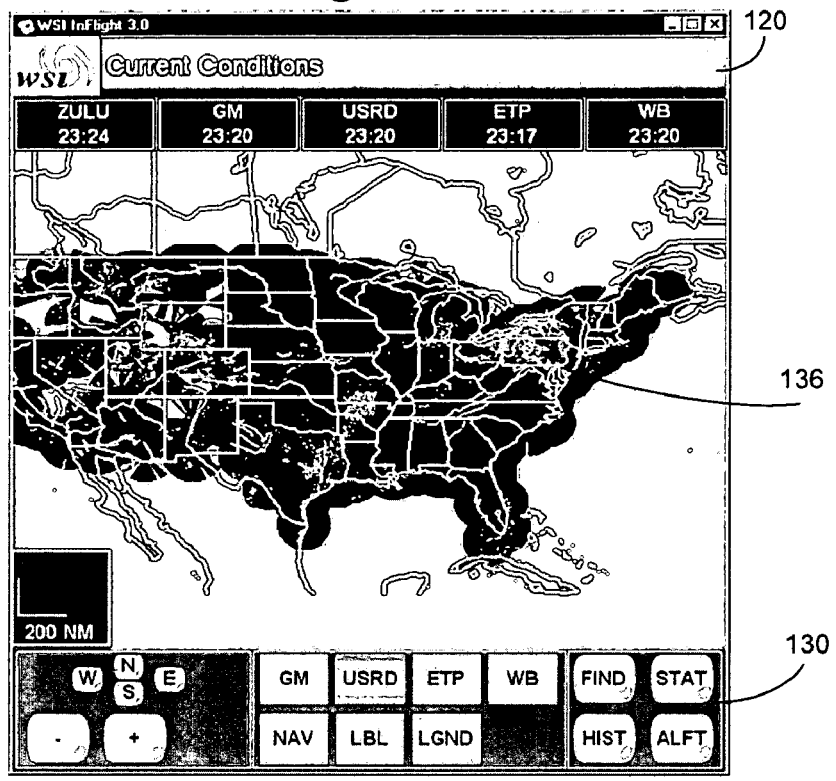
FIGS. 11 and 12 illustrate exemplary weather radar imagery.

As shown in FIG. 11, weather radar imagery for the continental United States and southern Canada may be displayed. The system 100 combines conventional radar imagery and NEXRAD reflectivity data into a single radar mosaic for the continental U.S. The data advantageously displays at a high 1 NM resolution and updates every 5 minutes. Table 4 indicates radar precipitation intensity color codes.

TABLE 4

| Color | Precipitation |
|---|---|
| Black | No significant precipitation. Rain < 20 dBZ or no return. Can be clouds but no droplets large enough to be rain. |
| Green | Rain 20 <= x <30 dBZ Light to moderate precipitation. |
| Yellow | Rain 30 <= x <40 dBZ Moderate to heavy precipitation with possible thunderstorms. |
| Red | Rain 40 dBZ or greater Heavy precipitation with probable thunderstorms. |
| Blue | Snow 5 dBZ or greater. Solid precipitation. |
| Pink | Mixed precipitation, 5 dBZ or greater Mixed solid and liquid precipitation, with icing probable. |

Table 5 is an alternate color palette.

TABLE 5

| Color | Precipitation |
|---|---|
| Black | No significant precipitation. Can be clouds but no droplets large enough to be rain. |
| Light green | Rain 15 <= x <20 dBZ Very light to light precipitation. |
| Med. green | Rain 20 <= x <30 dBZ Light to moderate precipitation. |
| Dark green | Rain 30 <= x <40 dBZ Moderate to heavy precipitation with possible thunderstorms. |
| Yellow | Rain 40 <= x <45 dBZ Moderate to heavy precipitation with probable thunderstorms. |
| Light orange | Rain 45 <= x <50 dBZ Heavy precipitation with probable thunderstorms. |
| Orange Rain | 50 <= x <55 dBZ Very heavy precipitation and thunderstorms. |
| Red | Rain 55 dBZ or greater Intense precipitation and thunderstorms. |
| Light blue | Snow 5 <= x <20 dBZ Light to moderate snow |
| Dark blue | Snow greater than 20 dBZ Solid precipitation. |
| Light pink | Mixed precipitation 5 <= x <20 dBZ Light to moderate mixed solid and liquid precipitation, with icing probable. |
| Pink | Mixed precipitation greater than 20 dBZ Heavy mixed solid and liquid precipitation, with icing probable. |

Figure 12:
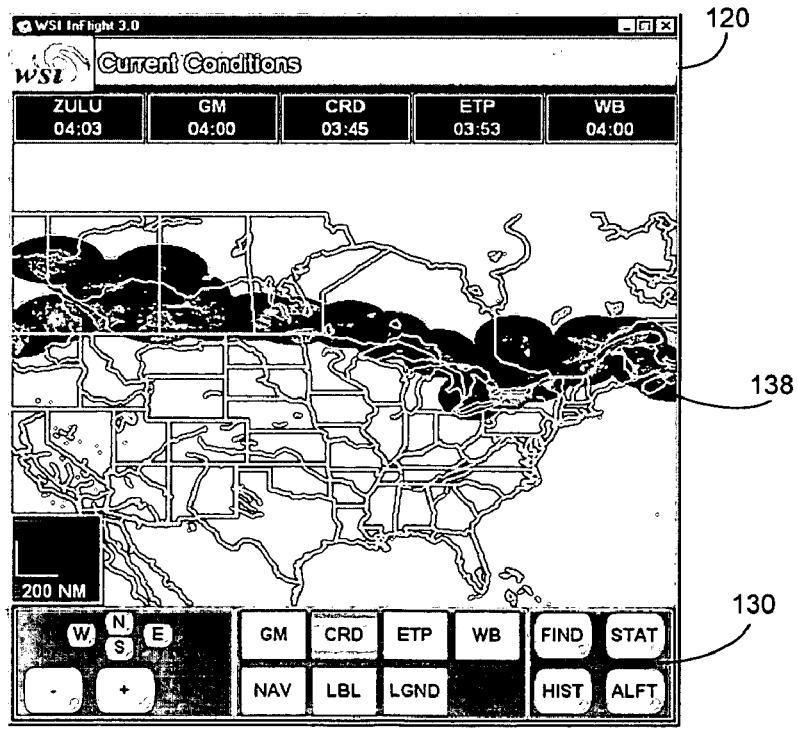

Weather radar data for southern Canada is collected and processed by Environment Canada. The imagery is displayed in the Canadian color palette, as shown in FIG. 12. As with U.S. radar, black indicates areas of radar coverage; grey areas are not covered.

Figure 13:
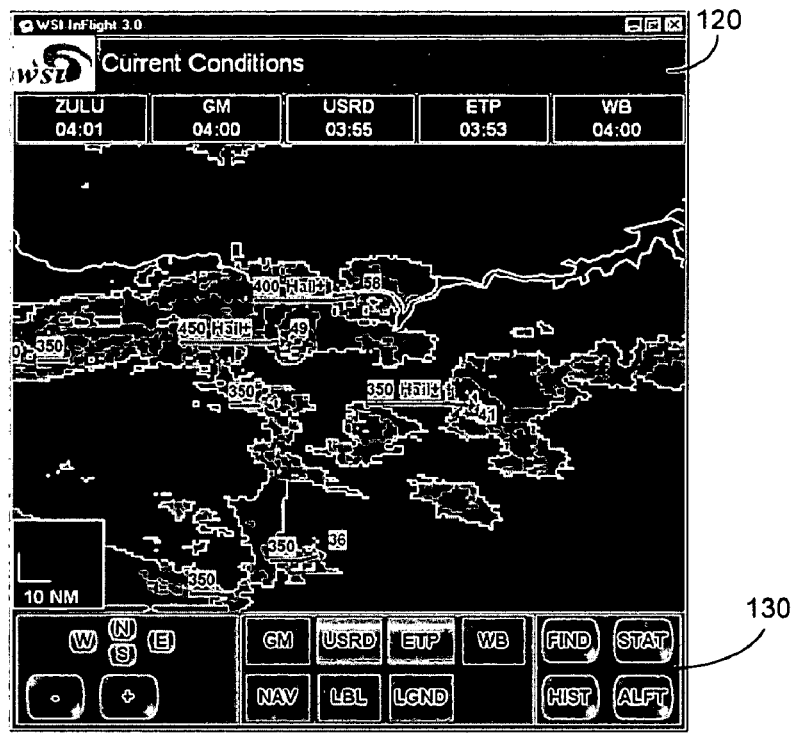
FIG. 13 illustrates an exemplary Echo Tops display.

FIG. 13 illustrates an Echo Tops display that indicates the location, elevation, and direction, if applicable, of a storm. Echo Tops are depicted using an arrow which indicates the location, height, and direction of a storm. The associated text indicating the storm cell height (in hundreds of feet) and its velocity (in knots). If storm direction and speed are unknown, a box is used instead of an arrow. Special labels also indicate hazardous phenomenon associated with the storm.

Because the system 100 receives a continuous stream of data over a satellite link, it can save updates for a predetermined period of time in local memory when the system 100 is operational. This data can be animated as looping weather images to show the progression of weather over time. An historical image displays previous versions of the product in arrival sequence and pauses after the most recent image. A time in the upper left hand corner of the image is provided as a tool for viewing the latest radar image. A zoom-in during animation will continue the animation on the zoomed image.

Figure 14:
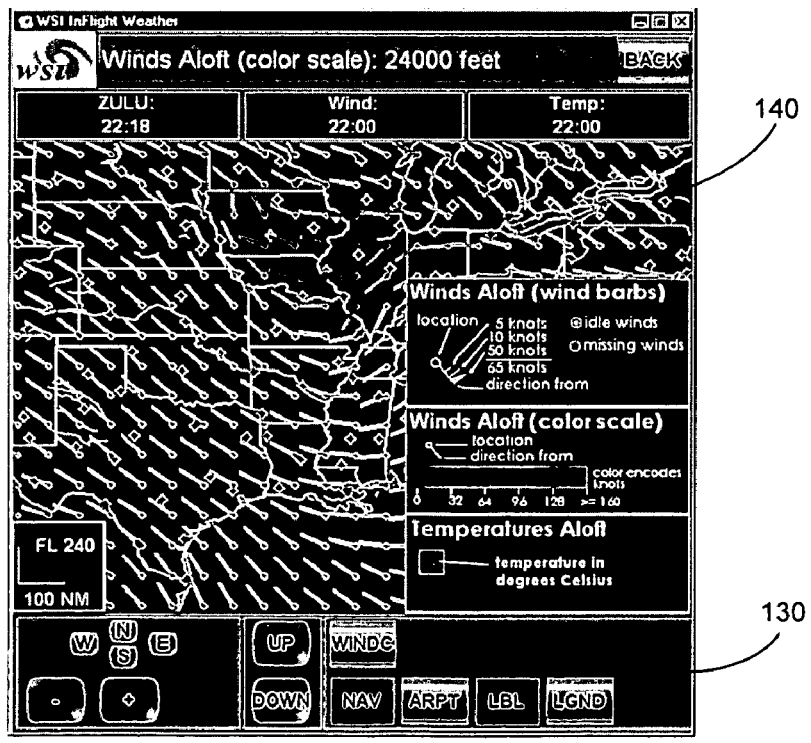
FIG. 14 illustrates an exemplary winds aloft window.

FIG. 14 illustrates a winds aloft window 140 that displays graphic representations of winds or temperatures at selected elevations. The display 140 may show conditions that were forecast by computer models for the current time. The data freshness values at the top of the window are the times the forecasts were valid. Navigation aids may be overlaid to show the location of VORs (VOR, VOR/DME, and VORTAC) and NDBs (i.e., non-directional beacons). The zoom level determines the types of NAVAIDs displayed-VORs are visible when the map scale is 25 NM or less; NDBs at 10 NM or less.

Figure 15:
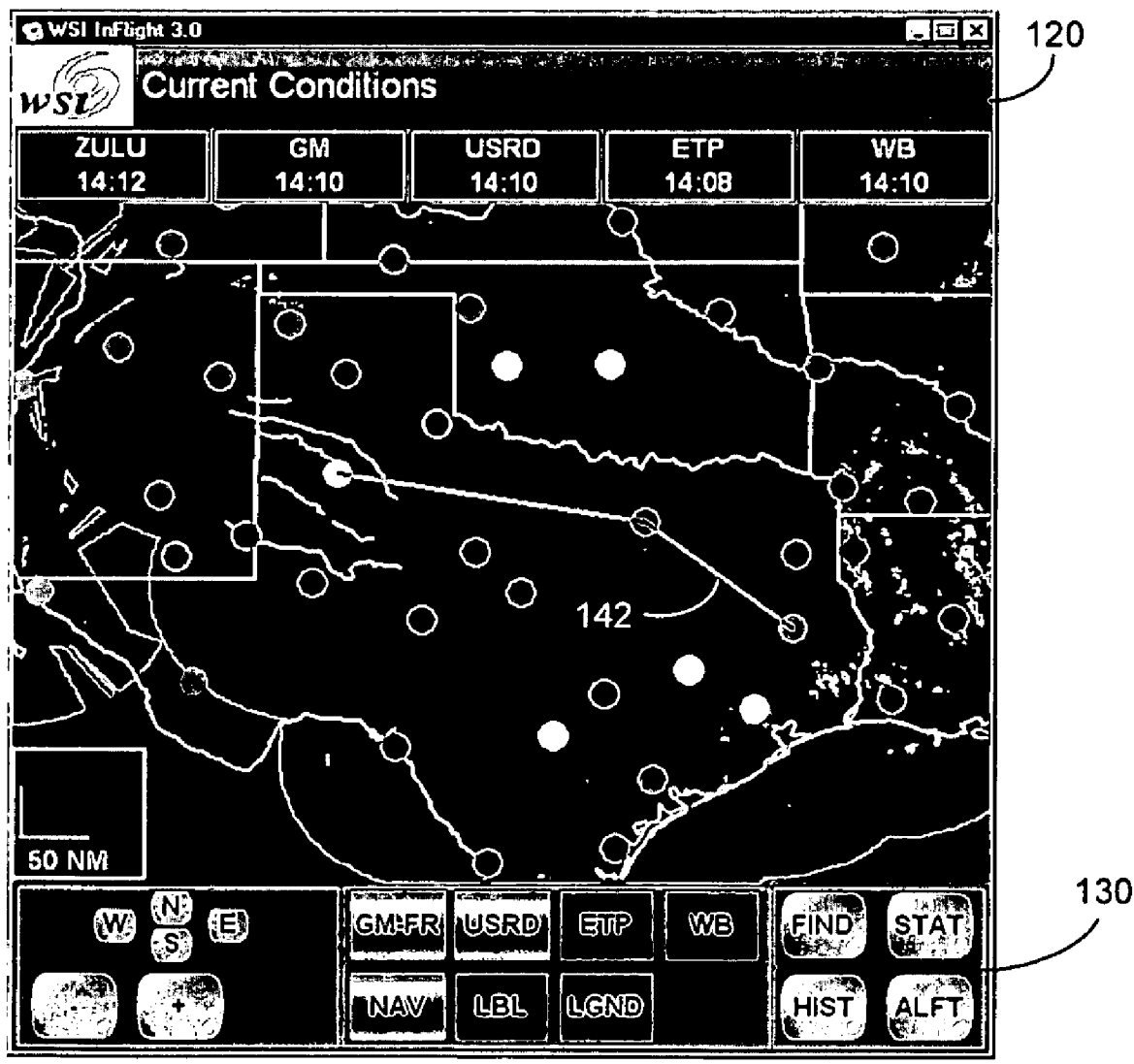
FIG. 15 illustrates an exemplary visualization of the impact of weather on a flight plan.

As shown in FIG. 15, to visualize the impact of weather on a flight plan, a flight route line 142 can be drawn between the origin and destination airports, including NAVAIDS and airports as en route points if desired. Methods that may be used to draw the line include clicking airport and NAVAID icons on the current conditions map display 120 or entering identifiers in a lookup window.

If a GPS system is connected and configured with system 100, GPS lock and flight tracking are available from the current conditions window 120. The GPS lock function centers the display to the aircraft position. GPS flight tracking displays a line indicating your previous flight path.

Figure 16:
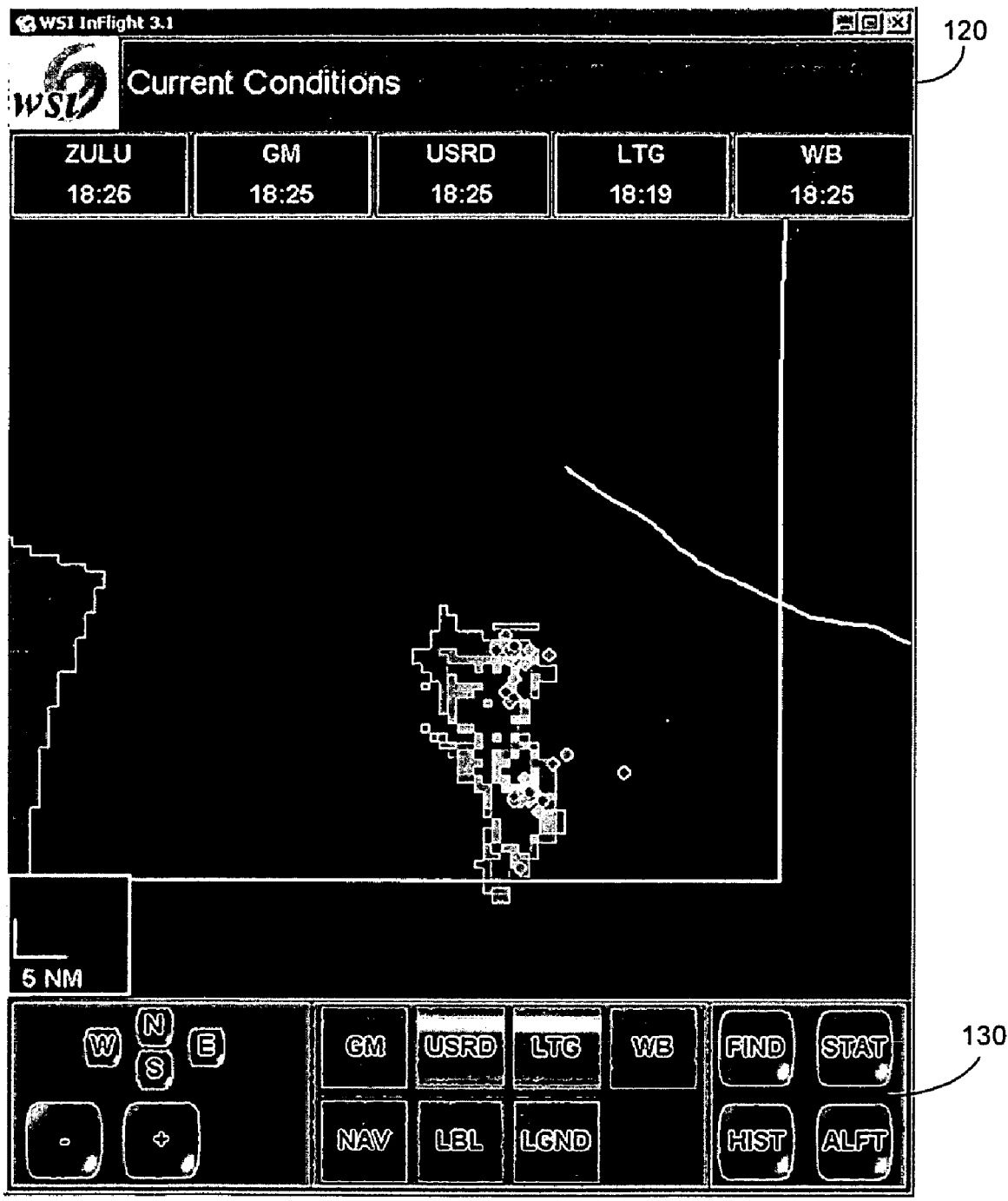
FIG. 16 illustrates exemplary lightning data.

Referring again to FIG. 2, lightning and pilot weather report (PIREP) data are provided by selecting a Point Weather (PTWx) button that toggles through Echo Tops (ETP), Lightning (LTG), icing PIREPs (iPRP), turbulence PIREPs (tPRP) and other PIREPs (oPRP). Ground-to-air lightning can be activated using the Point Weather (PTWx) button. The button is labeled Lightning (LTG) and green when the lightning data is shown on the screen. As shown in FIG. 16, when the lightning data is turned on, the time window indicates the time of the last lightning data update. Lightning data is preferably updated every 5 minutes and shown for a total period of 15 minutes. The data is shown in FIG. 16 may be over the continental U.S. (CONUS).

Figure 17:
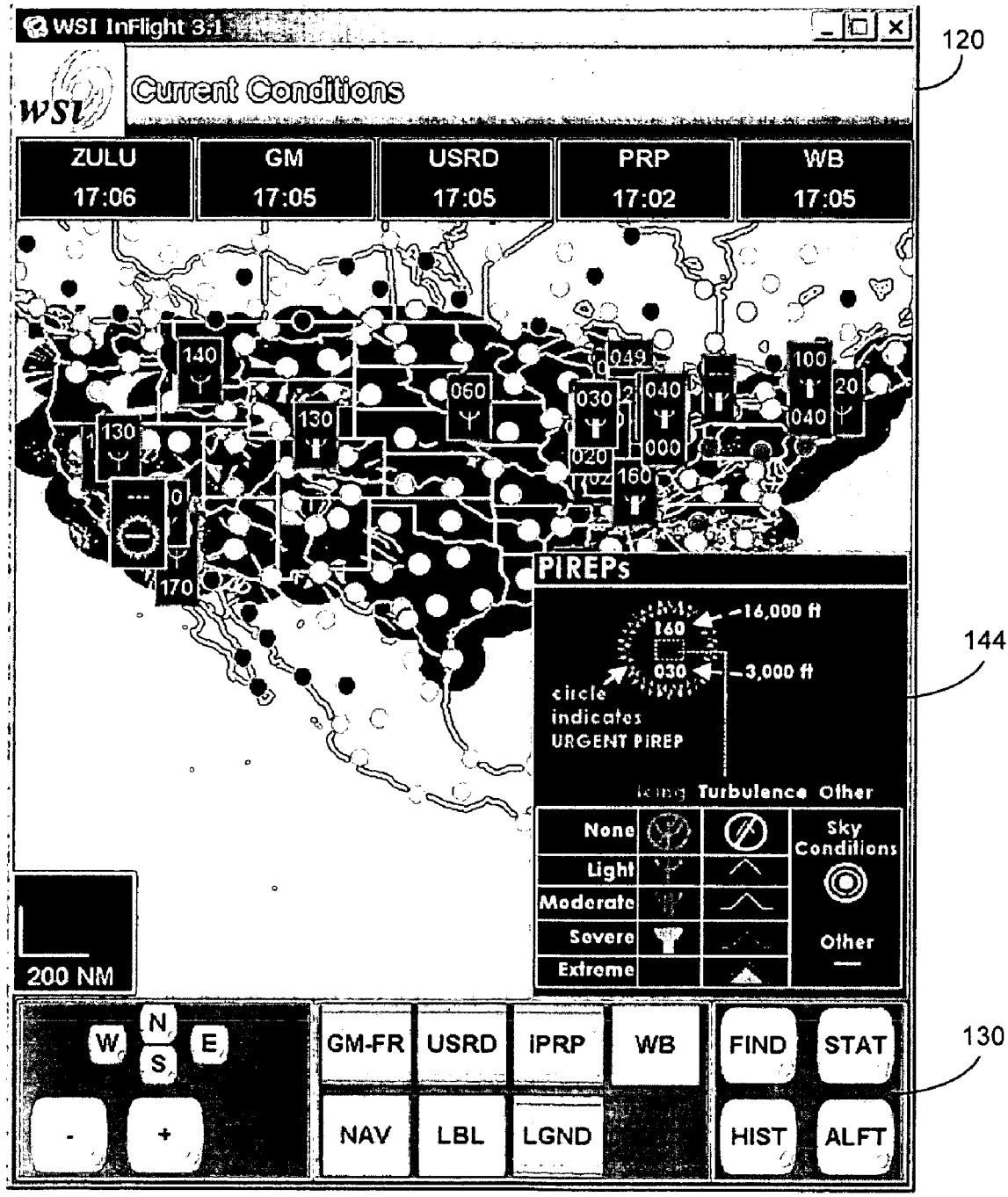
FIGS. 17-22 illustrate exemplary graphical pilot weather reports (PIREPs) and airline routine air reports (AIREPs)

Data from pilot weather reports (PIREPs) and airline routine air reports (AIREPs) can be seen in both the current conditions view and an aloft view. As shown in FIG. 17, one of three labels (iPRP, tPRP or oPRP, for Icing PIREPs, Turbulence PIREPs or Other PIREPs, respectively) is shown in the button row 130. When one of the three sets of PIREP data is turned on, the time window indicates the time of the last PIREP data update. PIREP data is preferably updated every 15 minutes and shown for a period of 2 hours.

When a set of PIREP data is turned on, the legend 144 provides a graphical description of the PIREP data. As can be seen FIG. 17, several icons and colors are used to describe the various severity levels and types of PIREPs. In all cases, altitudes relevant for the PIREP are shown above and below the PIREP icons.

Icing PIREPs

PIREPs in the U.S. Flight Service Station (FSS) database for which a value is reported in the icing field are shown when the iPRP button state is shown. In addition, other PIREPs that have an icing value reported in the Remarks field may also be shown. The icons used for none, light, moderate and severe icing are shown in the legend of FIG. 17. All icing PIREP icons other than severe icing are shown in blue. The severe icing icon is shown in magenta and marked by a wavy circle.

It is not necessary to provide a graphical distinction between icing types (i.e., rime, clear, mixed) and frequency (e.g., continuous, occasional and intermittent). When a range of icing conditions is reported (e.g., light to moderate icing), the graphical PIREP is depicted according to the most severe condition reported in the range (e.g., a moderate icing icon is used for a light to moderate icing report).

Turbulence PIREPs

Figure 18:
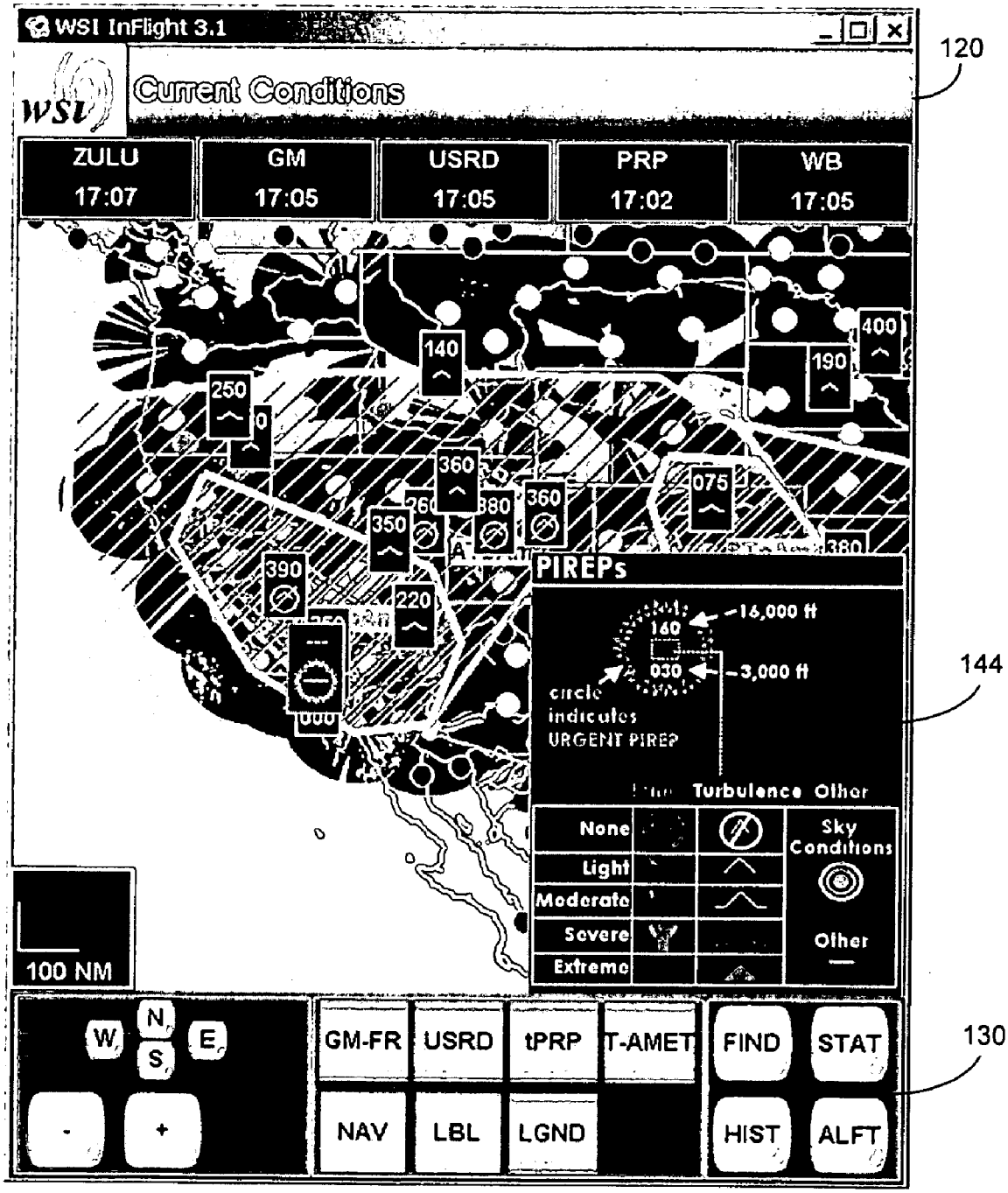

PIREPs in the U.S. FSS database for which a value is reported in the turbulence field are shown when the tPRP button state is shown. In addition, other PIREPs that have a turbulence value reported in the Remarks field may also be shown. The icons used for none, light, moderate, severe and extreme turbulence are shown in FIG. 18. Turbulence PIREP icons other than severe and extreme are shown in green. The severe and extreme turbulence icons are shown in magenta and marked by a wavy circle.

It is not necessary to make a graphical distinction between turbulence type (i.e., chop versus turbulence) and frequency (e.g., continuous, occasional, intermittent). Moreover, the level of chop is interpreted to correspond one-to-one to the level of turbulence (i.e., light chop is depicted using a light turbulence icon; moderate chop is depicted using a moderate turbulence icon, etc.). When a range of turbulence conditions is reported, the graphical PIREP is depicted according to the most severe condition reported in the range (e.g., a severe turbulence icon is used to depict a moderate to severe turbulence report).

Other PIREPs

Figure 19:
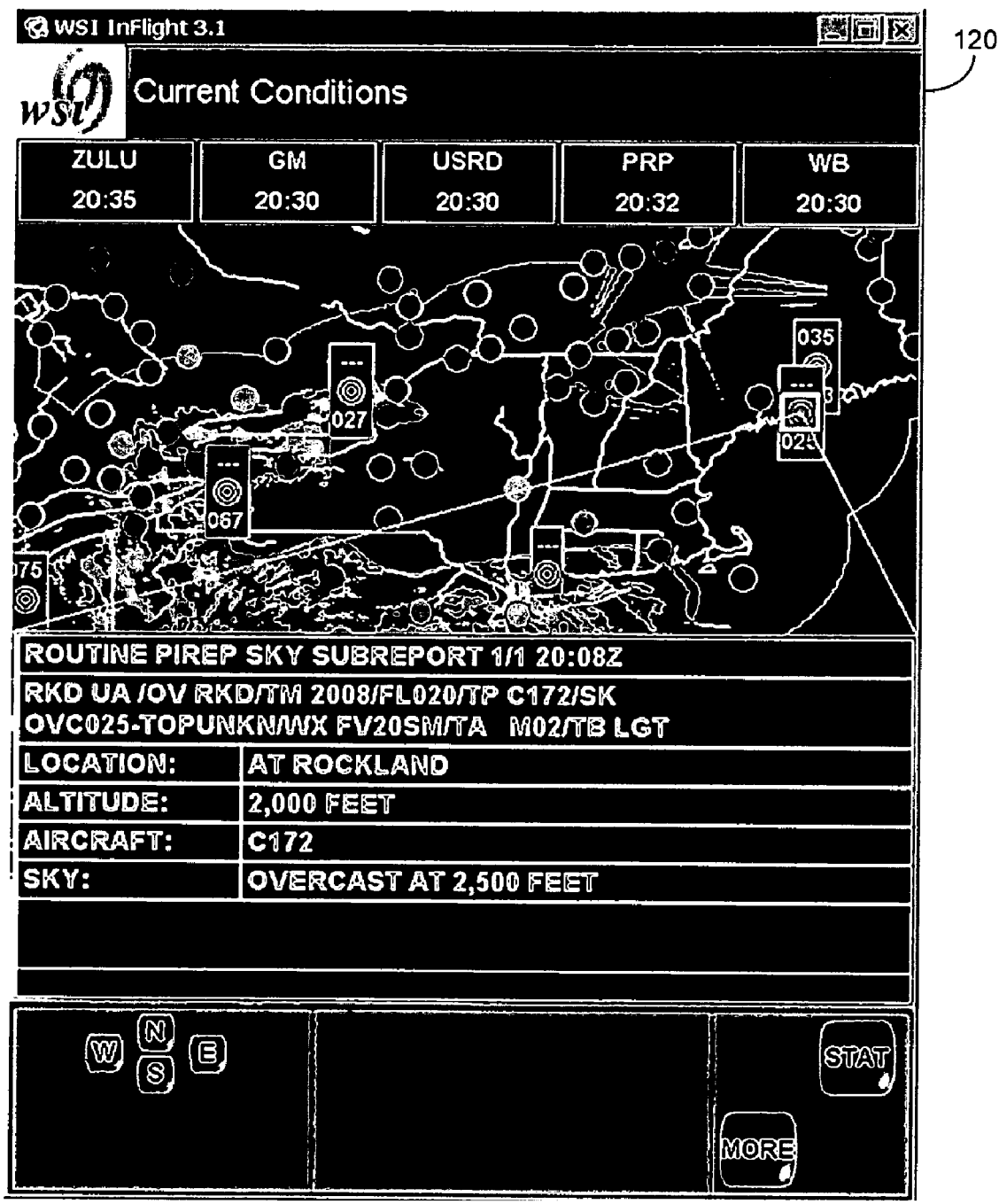

PIREPs in the U.S. FSS database for which a value is reported in the sky conditions field are shown when the oPRP button state is shown. In addition, other PIREPs that have sky condition values reported in the Remarks field may also be shown. FIG. 19 illustrates the Other PIREP view. The icon used for sky conditions is shown in the legend 144 of FIGS. 17 and 18.

Urgent PIREPs

Pilot weather reports are typically classified as urgent (UUA) on the basis of the weather phenomena they are reporting, including:

1. Tornadoes, funnel clouds, or waterspouts.
2. Severe or extreme turbulence (including clear air turbulence).
3. Severe icing.
4. Hail.
5. Low level wind shear. LLWS PIREPs as typically classified as urgent if the pilot reports air speed fluctuations of 10 knots or more, or if it is unknown; they are otherwise typically classified as routine. (Note: LLWS is defined as windshear within 2,000 feet of the surface).
6. Volcanic ash clouds.
7. Any other weather phenomena reported which are considered by the FAA specialist as being hazardous, or potentially hazardous, to flight operations.

Figure 20:
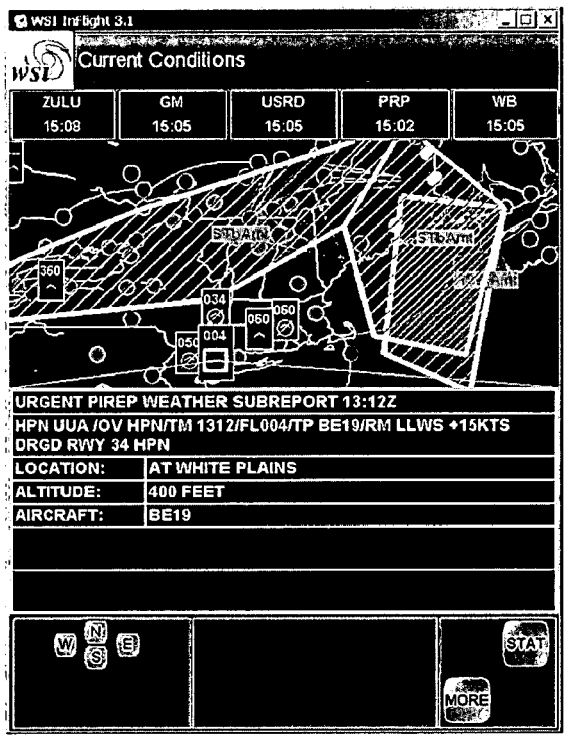
Figure 21:
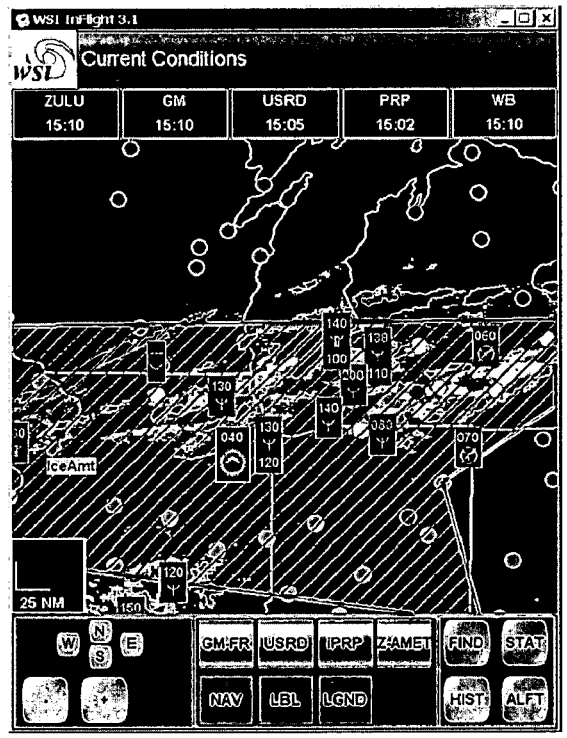

Urgent PIREPs are shown on InFlight differently from routine PIREPs, as can be seen in FIGS. 20 and 21. The PIREPs are colored in magenta and the icon is circumscribed with a wavy circle. Urgent PIREPs are preferably shown across all three layers of PIREPs (i.e., icing, turbulence and other conditions) regardless of whether they contain information related to the type of PIREP display selected.

Altitude Reports

The altitude reported in PIREPs is displayed next to the PIREP icon, as can be seen in FIGS. 17 through 21. If only one altitude is reported, it is shown above the icon. If an altitude range is reported, then the lower altitude of the range is depicted below the icon and the upper altitude of the range is depicted above the icon.

PIREPs in the Aloft View

Figure 22:
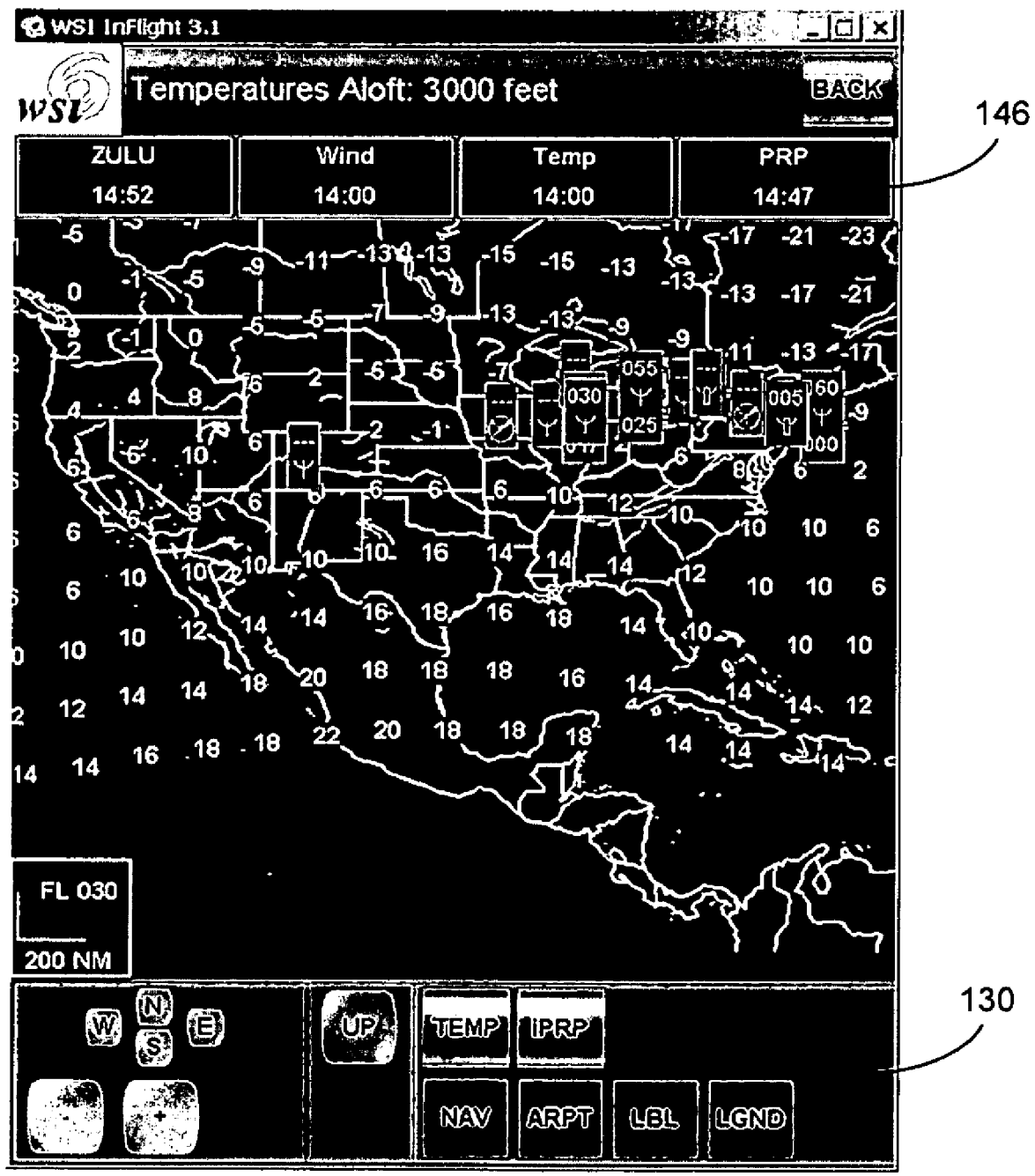

As shown in FIG. 22, the button panel 130 in the aloft view 146 includes a PIREP button (labeled as PRP) in the top right. The PIREP button has four toggles: PRP in grey, iPRP, tPRP and oPRP shown in green. Icing, turbulence and other PIREPs can be turned on in the Aloft View using the PIREP button. In the Aloft view, PIREPs are shown in altitude slices where only the PIREPs in the vicinity of the altitude selected (and those with an unknown altitude) are shown. FIG. 22 provides an example of Icing PIREPs shown in the vicinity of 3,000 feet in the Aloft view.

Textual PIREPs

Figure 23:
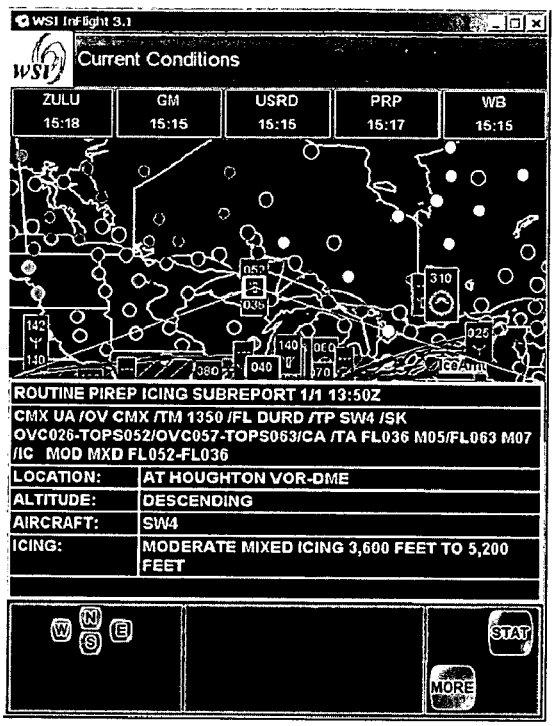
FIGS. 23-24 illustrate exemplary textual data that accompanies the PIREPs.
Figure 24:
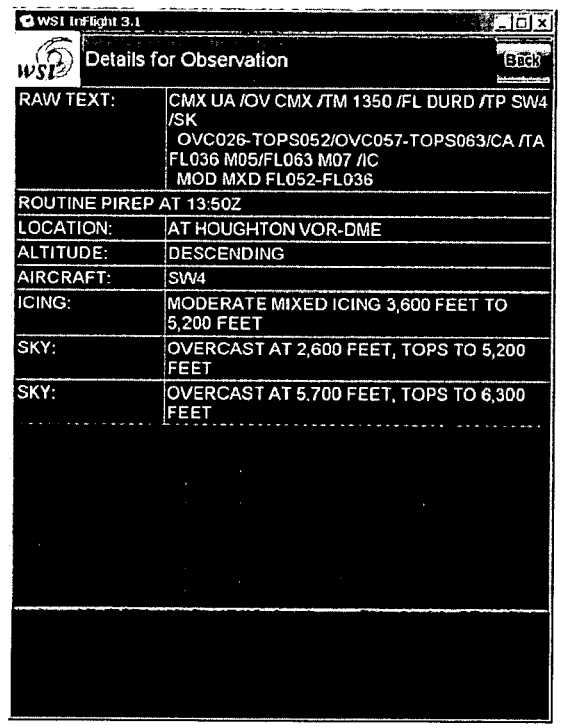

Textual PIREPs may be viewed by clicking on the PIREP icons in the Current Conditions view. As shown in FIG. 23, there is a pop-up window that provides the raw, un-decoded PIREP text in the second line. The first line provides a classification of the PIREP (routine versus urgent), identifies how many sub-reports may be graphically represented in the layer, and provides the time of the report. Below the un-decoded text, a partial decoding of the PIREP text is provided. It provides information about the location, altitude (if reported) and aircraft type. The last row of the field provides partially decoded information relevant to the PIREP layer selected. A more complete textual decoding of the PIREP is available by clicking the MORE button, as shown in FIG. 24.

In addition to the above, weather data can be compared to route information (e.g., either provided using the GPS system on-board the aircraft, the Flight Management System, an uplink of the flight plan information, a wireless or wired device, etc.) and information may be generated that show relative performance data. For example, route data including geographical navigation and/or aircraft true airspeed may be used to compute cumulative head-winds or tail-winds, or even total expected gained or lost time for a given aircraft geographical route. The aircraft route data that can be used for the computation may encompass either 2-dimensional spatial information (e.g., latitude and longitude of all the points along the trajectory), 3-dimensional spatial information (e.g., the latitude, longitude and altitude), or 4-dimensional spatio-temporal information (e.g., using latitude, longitude, altitude and either time or airspeed) or any combinations thereof. The route information may be based on a variety of data, including planned route, actual route based on FMS data, GPS, route information based on ATC surveillance systems such as terminal or air route radar, ATC preferred routes, another aircraft route, etc. or any combinations thereof. The information may be displayed graphically at a variety of altitudes in order to show pilots various cruising altitude options. The data may be presented using horizontal cross-sections, vertical cross-sections, inclined cross-sections, altitude slices, etc. The integrated head- or tail-wind component or total gained or lost time for a route segment or route of flight may be computed. An optimization algorithm may be used to provide recommendations to the user for the selection of cruising altitudes or adverse weather avoidance altitudes.

Using aircraft data, aircraft performance information may also be derived and either provided to the pilot or provided to other on-board systems. For example, using aircraft data including average fuel consumption at various pressure altitudes and aircraft weights, the system may compute the cumulative expected fuel burn for a route (planned, actual, etc.) or altitude. Alternatively, aircraft performance information such as desired power settings, desired cruising speed, desired aircraft anti-icing equipment use, desired cabin heating setting, etc. could be computed.

While the present invention has been described in connection with the preferred embodiments of the various Figs., it is to be understood that other similar embodiments may be used or modifications and additions may be made to the described embodiment for performing the same function of the present invention without deviating therefrom.

What is claimed:

1. A weather briefing system, comprising:
   an antenna;
   a receiver connected to said antenna; and
   a display device,
   wherein pilot weather reports are communicated via said antenna, formatted into a graphical representation comprising icons and colors, and displayed on said display device over a base map in accordance with a user selection,
   wherein at least one data set from said pilot weather reports is based on actual weather condition data collected at an aircraft in flight and reported for a specific altitude and geographic location, and
   wherein information is generated about alternate routes based on the actual weather condition data to provide a selection of adverse weather avoidance altitudes.

2. The system of claim 1, wherein said pilot weather reports are received from a satellite on a near real-time basis.

3. The system of claim 1, wherein said pilot weather reports are displayed in graphical format.

4. The system of claim 3, wherein updates are received approximately every five minutes at altitude.

5. The system of claim 3, further comprising:
   a client application which displays said pilot weather reports; and
   a configuration utility configures settings for the system.

6. The system of claim 3, wherein a present conditions window is provided comprising said base map, said pilot weather reports in said graphical format, and navigation aids.

7. The system of claim 6, wherein historical weather information is provided by accumulating and storing said pilot weather reports over a predetermined period of time.

8. The system of claim 6, wherein said present conditions window displays at least one of a icing reports, turbulence reports, other reports, and urgent reports.

9. The system of claim 8, wherein a severity of icing conditions is represented through variations in icons and colors.

10. The system of claim 8, wherein a severity of turbulence is represented through variations in icons and colors.

11. The system of claim 8, wherein said urgent reports include information regarding at least one of tornadoes, extreme turbulence, severe icing, hail, wind shear, and volcanic ash clouds.

12. The system of claim 3, further comprising providing watch information in display regions that are outlined by bounding boxes, said watch information indicating locations where pilots may encounter weather warning conditions.

13. The system of claim 3, further comprising providing a flight route line on said display device.

14. A method implemented in a computing system for providing an in-flight pilot weather report, comprising:
   receiving said pilot weather report, wherein at least one data set from said pilot weather reports is based on actual weather condition data collected at an aircraft in flight and reported for a specific altitude and geographic location;
   processing said pilot weather report to produce graphical information comprising icons and colors;

generating information about alternate routes based on the actual weather condition data to provide a selection of adverse weather avoidance altitudes; and displaying said graphical information indicative of at least one of echo tops, lightning, icing, turbulence, other pilot report information, and urgent pilot report information over a base map.

15. The method of claim 14, further comprising:

providing said icons and colors in accordance with a severity of said pilot weather report; and providing a legend to describe said graphical information.

16. The method of claim 15, further comprising providing said pilot weather reports based on data contained in a flight service station database.

17. The method of claim 16, further comprising providing textual comments to augment said graphical information.

18. A method of providing in-flight pilot weather reports to aircraft aloft, comprising:

providing said in-flight pilot weather reports to said aircraft via a satellite communication, wherein at least one data set from said in-flight pilot weather reports is based on an actual weather condition data collected at an aircraft in flight and reported for a specific altitude and geographic location;

processing said in-flight pilot weather reports to provide a graphical representation of said in-flight pilot weather reports, said graphical representation comprising a base map, colors, and icons;

providing a base display on which said graphical representation is displayed; and prioritizing said in-flight pilot weather reports to generate information about alternate routes based on the actual weather condition data and to superimpose said graphical representation over said base display where urgent information is displayed over other information.

19. The method of claim 18, further comprising indicating a severity of conditions through variations in said icons and colors.

20. The method of claim 18, further comprising providing a flight route line on said base display.

* * * * *